July 25, 1967 W. K. PRATT 3,333,056
TELEVISION BANDWIDTH REDUCTION SYSTEM
Filed Oct. 1, 1963 9 Sheets-Sheet 1

INVENTOR.
WILLIAM K. PRATT,
BY
E. L. Oberheim
AGENT.

July 25, 1967 W. K. PRATT 3,333,056

TELEVISION BANDWIDTH REDUCTION SYSTEM

Filed Oct. 1, 1963 9 Sheets-Sheet 3

July 25, 1967 W. K. PRATT 3,333,056

TELEVISION BANDWIDTH REDUCTION SYSTEM

Filed Oct. 1, 1963 9 Sheets-Sheet 4

TELEVISION BANDWIDTH REDUCTION SYSTEM

TELEVISION BANDWIDTH REDUCTION SYSTEM

Filed Oct. 1, 1963

9 Sheets-Sheet 8

United States Patent Office 3,333,056
Patented July 25, 1967

3,333,056
TELEVISION BANDWIDTH REDUCTION SYSTEM
William K. Pratt, Los Angeles, Calif., assignor to Hughes Aircraft Company, Culver City, Calif., a corporation of Delaware
Filed Oct. 1, 1963, Ser. No. 313,097
6 Claims. (Cl. 178—6.8)

The present invention relates generally to television systems and more particularly to an edge detection television system which digitally codes a standard video signal to match a narrow bandwidth transmission channel and subsequently detects the received signal for display on a standard TV monitor.

Television picture transmission over long distances is becoming increasingly important for purposes of scientific communication. At interplanetary transmission distances with minimal operating power, electrical noise becomes a serious problem. The noise combatting characteristics of digital transmission of television signals are particularly attractive, but the digital coding of TV signals increases the transmission bandwidth. Any increase in transmission bandwidth necessitates an increase in transmitting power. Since the required transmitter power is proportional to the square of the transmission distance, a reduction in bandwidth of the transmission channel required for transmitting the TV signals is extremely desirable for deep space probes. Many methods have been explored to reduce the transmission bandwidth required for transmitting the digitally coded TV signals. This invention deals with one of the more promising methods—the edge detection system.

The standard TV picture is transmitted at a rate of 30 frames per second and contains approximately 250,000 dots or elements per frame. The lower limit for continuous picture movement is about ten frames per second. Below this figure objectionable flicker and jerkiness of movement of the picture will be noticed. Fewer than 250,000 picture elements or dots per frame will create a grainy picture with degraded resolution. The type of picture and the audience dictate the frame rate and the bit density.

Even with the most sophisticated transmission bandwidth reduction schemes, the power required for the transmission of standard TV pictures over interplanetary distances may not be feasible. Since the transmission bandwidth is proportional to both the frame rate and the reciprocal of the element or dot size, transmission bandwidth requirements may be reduced by relaxing the picture requirements, but element or dot size cannot be increased without impairing picture quality. Reduction of the frame rate allows the transmission of a full resolution picture, but increases the transmission time.

When the frame rate falls below ten frames per second, television in effect ceases to exist since the illusion of continuous motion is destroyed. Low frame rate transmission is essentially the transmission of a series of snapshots. While it is necessary to maintain a picture element density near to that of standard TV to provide adequate resolution, the picture may be changed in area to accommodate transmission methods. An artifice used to compare transmission schemes is to consider scan rates of pictures in terms of the standard TV frame of approximately 250,000 elements.

For a standard TV picture the scan rate is high enough so that the scene will be essentially constant over a frame. However, slow scan rates require the scanning of photographs of some type or of only opening a TV camera shutter for a short period of time to arrest image motion. For a typical flyby mission of a planet, 10,000 pictures of about $25\times10^4$ elements or dots each might be taken in a half-hour period and stored by some means such as an electrostatic camera. The transmission of these data by a standard five bit pulse code modulation transmission system (PCM) at an equivalent frame rate of $5\times10^{-4}$ frames per second would require 145 days, assuming a bit transmitting rate of 1,000 bits per second.

Clearly, it is desirable to reduce the time required to transmit these pictures. One obvious method is to increase the picture scan rate. But, increasing the scan rate in the pulse code modulation (PCM) transmission system necessitates a direct increase in the bit transmission rate which is limited by the available continuous power. It has been estimated that the maximum bit transmission rate obtainable in the near future will be in the vicinity of 1,000 bits per second for an interplanetary mission. If the bit transmission rate is maintained constant and the scan rate increased without degrading the picture quality, then the bandwidth of the picture transmission channel must be effectively reduced. Bandwidth reduction or compression in this case can be achieved by reducing the number of bits required to describe a single picture.

A reduction in the number of bits per picture is achievable by eliminating redundant information in the transmitted picture signal. One approach to the elimination of redundancy in transmitted signals, from the point of view of picture quality and transmission bandwidth reduction, utilizes what is known as the edge detection coding system described in such articles as "Synthetic Highs—An Experimental TV Bandwidth Reduction System," published in the Journal of the SMPTE, vol. 68, August 1959, pp. 525–537 by W. F. Schrieber, C. F. Knapp and N. D. Kay; and "TV Bandwidth Reduction by Digital Coding," I.R.E. Convention Record, 1958, Part IV, pp. 88–99, by W. F. Schrieber and C. F. Knapp.

The systems described in the above referenced articles, however, have the disadvantage of requiring the use of a large, high-speed memory at both the transmitter and receiver to store one frame of picture information. In these systems, the picture is electrically scanned at the normal element rate (4 mc. bandwidth) and coded electrical signals representing picture edges are stored as they occur. The coded edges in the memory are then transmitted at a slower constant rate. For average pictures the memory must contain about 30,000 seven-bit words. Such a memory would present many obvious problems for a transmitter employed in a space vehicle.

One object of the present invention is to provide an improved picture transmission system.

Another object of this invention is to provide an improved picture transmission system in which the requirement for digital memory facilities is minimized.

A further object of this invention is to provide an improved picture transmission system employing the edge detection principle in which scanning of a line of picture information is accomplished in a plurality of sequential stop-scan operations.

Further to the preceding object, it is an object hereof to provide for recycling of the stop-scan operation in dependence upon detection of a picture edge, or, after a predetermined interval in the event a picture edge is not detected.

Yet another object of this invention is to provide an improved picture transmission system of the edge detection type which transmits a minimum amount of redundant information.

More specifically, with respect to the preceding object, it is an object hereof to provide an improved stop-scan edge detection picture transmission system in which edge-to-edge picture information transmission redundancy in a single line is minimized and in which picture information transmission redundancy with respect to correspondingly positioned edges of about the same brightness or amplitude in successive lines is minimized.

Still another object of this invention is to provide an improved picture transmission system which cannot be overloaded The aforesaid and other objects and advantages are accomplished in a television system employing a camera arrangement for presenting pictures which may be electronically scanned. The television system generally includes a digital transmitting system which controls the camera and which is responsive to the video signals produced by the camera. Transmission channel bandwidth reduction is achieved by minimizing the transmission of redundant video or picture signals. The television system also includes a receiving system which may operate synchronously with the transmitting system for receiving, storing, decoding in a particular sequence, summing the decoded high and low frequency decoded signals to produce a synthesized video signal and displaying the synthesized video signals.

The transmitting system employs a stop-scan mode of operation for detecting picture edges. The digitally coded signals produced by the transmitting system in the stop-scan edge detection mode of operation contain the high frequency components of the picture signal, sometimes referred to as the "highs." The transmitting system employs a uniform scan rate for detecting the low frequency components of the picture or video signal, sometimes referred to as the "lows." The low frequency components are also digitally coded. Beam control for scanning operation is under the control of a suitable digital counter system, having a horizontal scanning counter producing coded signals indicative of horizontal positions of the beam and a vertical scanning counter controlled by the horizontal scanning counter and producing coded output signals indicative of a particular vertical position of the beam. The coded signals are converted and amplified and applied as stair-cased sweep voltages to the respective horizontal and vertical deflection systems of the camera tube. A suitable switching device coupled to and controlled by the scanning counters and having outputs controlling a transmit control circuit, provides an arrangement, in conjunction with additional circuits in part under the control of the transmit control circuit, for sequentially scanning a picture presented to the camera tube for the high frequency signal components and for the low frequency signal components.

In the first mode of operation, herein referred to as the stop-scan edge detection mode of operation, the entire picture is scanned. With the occurrence of each edge signal of a predetermined magnitude different from the magnitude of an immediately preceding edge signal in a line being scanned, the beam is momentarily stopped and then blanked by a suitable blanking control circuit associated with the camera tube and controlled by the circuits controlling the stop-scan operation of the beam. Circuits receiving the picture or video signals, digitally code or quantize the amplitude of the difference edge portion of the picture or video signal and circuits operating synchronously with the scanning counters are utilized to recycle the scan interval, in the absence of an edge signal during any one scan interval, and, at the same time, to digitally code or quantize the specific position of the beam horizontally within the scan interval. These coded signals representing edge amplitude, that is, brightness, and position are transferred in parallel to suitable output circuits, such as conventional shift register circuits, for immediate serial transmission. This stop-scan mode of operation and the serial transmission of each amplitude and position signal continues throughout an entire picture frame.

At the end of the picture frame scanning operation in the stop-scan mode of operation, the horizontal and vertical scanning counters have both reached a predetermined count, in this case, full counts, and a switching device under the control of the vertical scanning counter now switches or transfers the transmit control circuit so that detection of the low frequency components of the picture or video signal takes place. The horizontal and vertical scanning counters now recycle and the picture is rescanned at a uniform scan rate for the low frequency components. The low frequency circuits which are now coupled by the transmit control circuit to the camera output, detect and quantize the low frequency components of the picture or video signal and these in turn are coupled to the transmitter and transmitted.

Inasmuch as the transmitted edge amplitude and position signals do not occur at a uniform frequency, provision is made in the receiver for storage facilities capable of storing the coded high frequency components of the picture or video signal. The stored information on the high frequency components of the picture or video signal is processed sequentially in the receiver system. As part of the sequential processing, the edge amplitude signals are converted to their analog equivalents at instants of time in the receiving system cycle providing the precise position of the respective edge amplitude signals in the final picture display corresponding to those in the picture which was scanned. Inasmuch as the low frequency components of the picture or video signals are transmitted on the second scanning, the sequential conversion of the amplitude signals to provide the high frequency components of the picture or video signal may now be synchronized with the appearance of the low frequency components for the respective high frequency components in the receiver. The video signal is now synthesized by combining the appropriate "highs" and "lows" of the picture or video signal which was transmitted. This may be accomplished by means of a suitable summing amplifier simultaneously receiving the associated high frequency and low frequency signal components of a picture or video signal. The output of the summing amplifier is therefore a synthesized picture or video signal corresponding to that produced by the camera, at the transmitter, each of which synthesized signals occupies a position in the sweep or scan cycle of a synchronously controlled monitor corresponding to the position occupied in the scan cycle at the camera, thereby permitting reconstruction of the transmitted picture at the monitor.

By the use of the stop-scan edge detection principle of operation in sequence with a uniform rate of scan of a particular picture, all of the signal information required to reproduce a specific picture being scanned is obtained and, importantly, the stop-scan principle of operation permits the use of a very small storage capacity for coded signals representing instantaneous positions and amplitudes of detected picture edges within a short scan interval. Such storage facility need only be large enough to code the brightness of an edge, which in one embodiment of this invention involves only three bits of signal information, and to code the specific position of the beam within a scan interval which, in the embodiment of the invention referred to, need involve no more than about four or five bits of signal information.

In addition to the aforesaid, the transmitting system incorporates additional facilities for minimizing the transmission of redundant picture signal information by means of circuits providing correlation of picture edges on a line to line basis. Such an arrangement requires a storage register facility including individual registers, one for each brightness bit, each providing a register capacity equal to the number of dots or elements in a line of picture information. The information concerning brightness bits for a particular line of information is thus stored and compared with those in corresponding positions in a following line of information. If a difference exists, the edge of the previous line is transmitted.

The subject matter of this application is further described in a paper by the inventor herein, presented at the 1962 National Symposium on Space Electronics and Telemetry, Oct. 2, 3, 4, 1962, and forming part of the IRE PGSET record.

Other objects and advantages will be apparent from a study of the following specification when considered in conjunction with the accompanying drawings in which:

FIG. 1 is a block diagram of a television transmission system embodying the principles of this invention;

FIG. 2 graphically depicts a representative picture or video signal of the type derived from a camera tube, for example;

FIG. 3 graphically depicts the low frequency components of the picture or video signal of FIG. 2;

FIG. 4 graphically depicts the high frequency components of the picture or video signal of FIG. 1;

FIG. 5 is a receiving system of a type employable with the transmitting system of FIG. 1 and embodying the principles of this invention;

FIGS. 6*a* and 6*b* together illustrate the transmitting system of FIG. 1 in greater detail;

FIGS. 7*a* and 7*b* together illustrate the receiving system of FIG. 5 in greater detail;

FIGS. 7*c*, 7*d* and 7*e* show typical signals of the receiver circuit;

GENERAL TELEVISION SYSTEM

*Transmitting system*

Figure 1:
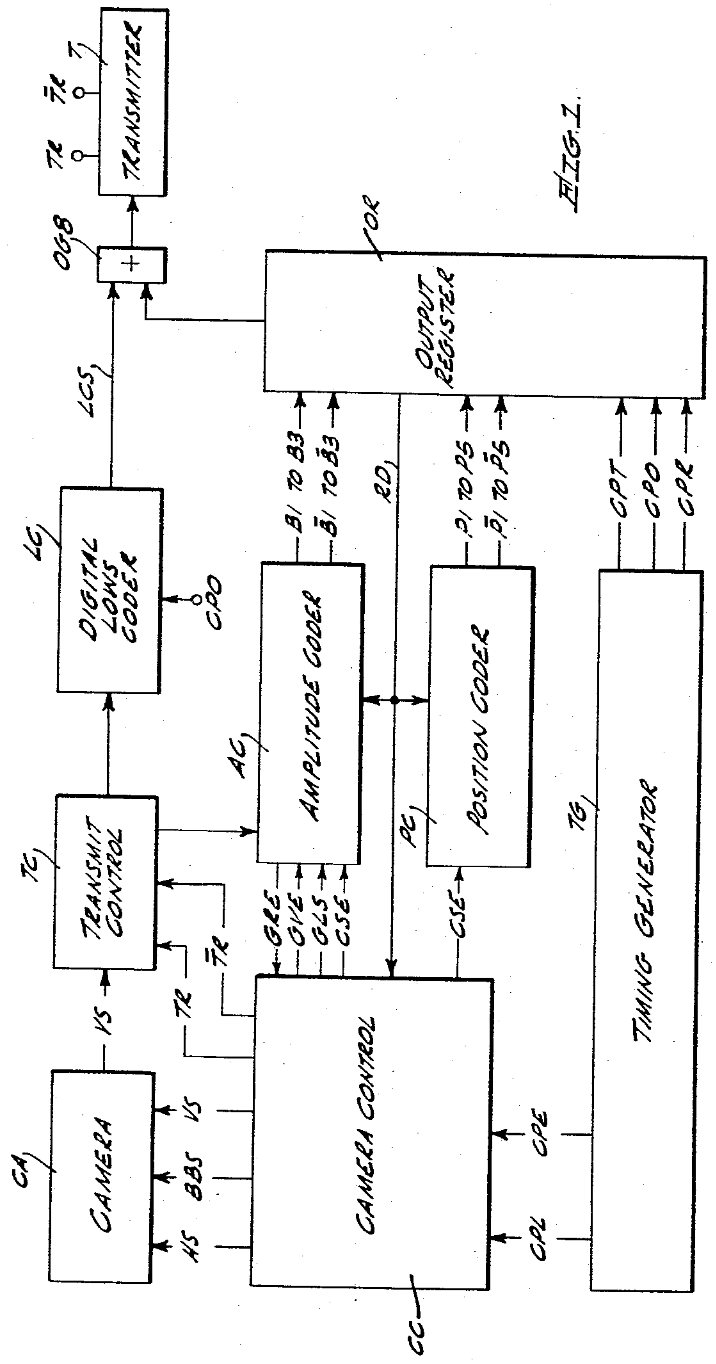

With reference to FIG. 1, the television system may comprise a conventional television camera CA including a camera tube capable of electronically scanning a particular picture or scene and producing electrical output signals as the electron beam forming part of the camera tube scans the screen on which the picture or scene is projected. Other suitable types of camera tubes may be employed, for instance, those providing electrical storage of the picture or scene on a suitable screen, which after scanning may be erased. These and other types of conversion arrangements for translating a picture into electrical signals of particular types under the control of an electron beam scanning operation are contemplated within the scope of this invention.

The camera CA is under the control of a camera control circuit CC producing horizontal and vertical scan signals HS and VS, respectively, together with a beam blanking signal BBS which operates to unblank the electron beam of the camera tube at any instant when a picture information signal sample is to be derived.

Figure 8:
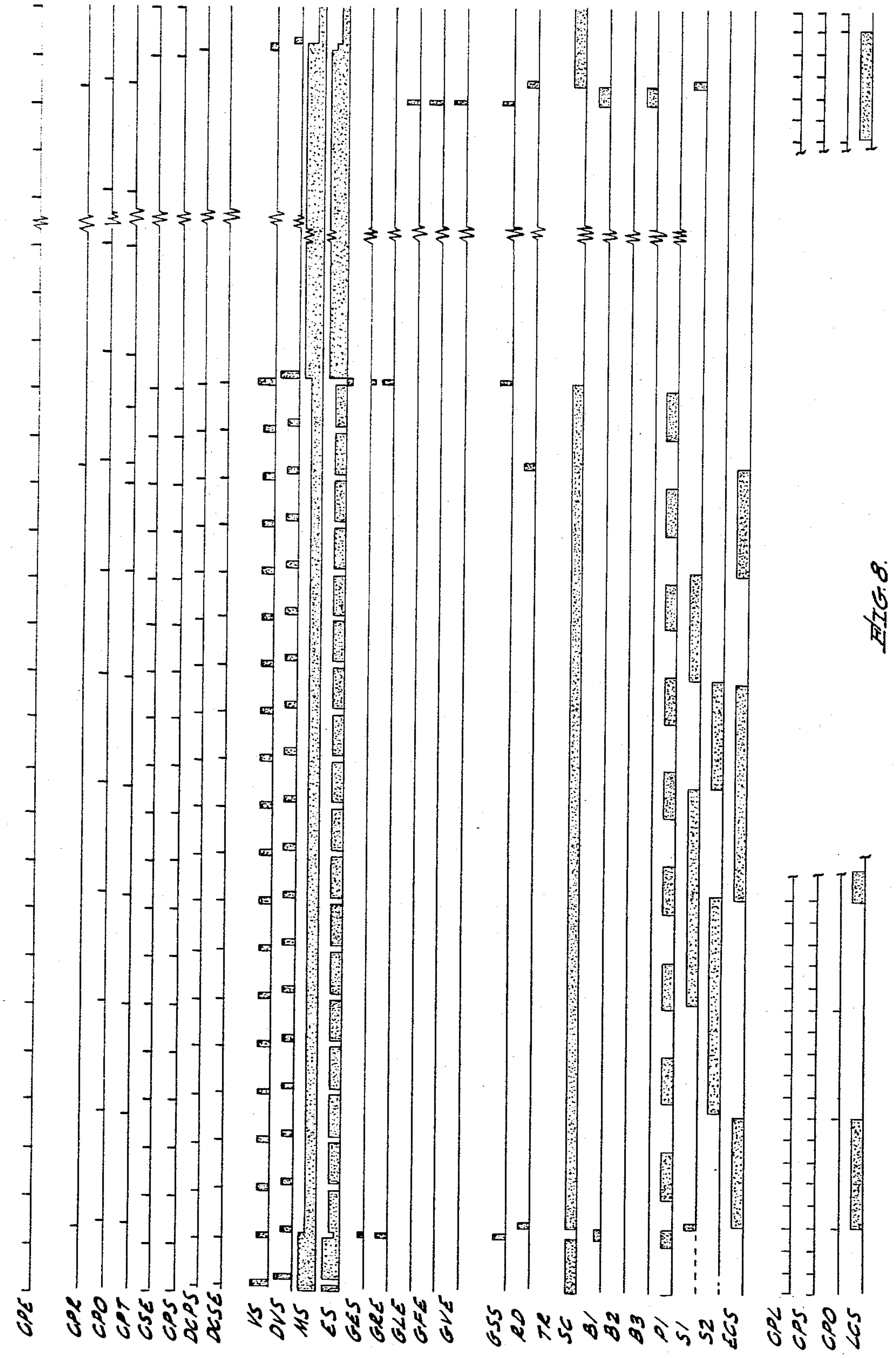
FIG. 8 is a timing signal diagram showing the relationships of various signals referred to herein.

The camera control circuit, as well as other elements and circuits of the system yet to be described, are under the control of a timing generator TG which produces a "lows" scanning pulse CPL, a "highs" or edge scanning pulse CPE, a transmit pulse CPT, an output register shift or readout pulse CPO and an edge read pulse CPR. These signals are depicted in FIG. 8 and are of the form of voltage pulses having predetermined frequencies and having phase relationships, as shown.

As will be described, the camera control circuit comprises horizontal and vertical scanning counters of sufficient capacity to provide stepping of the scanning electron beam of the camera tube from one picture element or dot to the next in sequence along a line on a line-to-line basis, to completely scan the screen of the camera tube. The quantized voltages produced by the horizontal and vertical scanning counters are converted by means of digital to analog converters forming a part of the camera circuit, to provide horizontal and vertical staircased sweep signals or voltages HS and VS, respectively.

Scanning of the camera tube screen is conducted in a conventional manner, that is, the horizontal sweep voltage steps from its minimum to its maximum value, at which time the horizontal scanning counter is reset. Recycling of the horizontal scanning counter is utilized along with a scanning pulse generated in response to the "lows" signal pulse CPL or the picture edge scanning pulse CPE, to step the vertical scanning counter, as will be described. Picture scanning begins at the top and steps downwardly after each horzontal scan on a line-to-line basis, in keeping with conventional practice, but may be conducted in any manner providing complete scanning of the picture.

The camera control circuit also produces a pair of transfer signals TR and $\overline{TR}$. These signals are produced by means of a transfer switch such as a flip flop controlled by the vertical counter. The arrangement provides for two modes of operation. In the first mode, which is the stop-scan edge detection mode of operation, the transfer signal $\overline{TR}$ is in the higher of its two voltage states and results in the control of the transmit control circuit TC to produce a gated video signal which is coupled to an edge amplitude coder circuit AC. In the second mode, the transfer signal TR is in the higher of its two voltage states and results in gating of the video signal to a digital lows coder circuit LC.

The transmit control circuit in one embodiment of this invention is a sampler, the details of which are disclosed at a later point, in which the signals TR or $\overline{TR}$ from the camera control circuit TC operate to selectively enable individual sampler circuit sections so that video signals may be coupled selectively to the edge amplitude coder AC or to the digital lows coder LC.

The edge amplitude coder is effectively an analog to digital converter which is capable of quantizing the difference voltage amplitude or magnitude of sequentially occurring edge signals. The difference voltage or edge signal is produced by an edge detector in the edge amplitude coder described at a later point. The quantized output of the edge amplitude coder is represented in signals B1 to B3 and $\overline{B1}$ to $\overline{B3}$, as will be described, which are the electrical outputs of the edge amplitude or brightness coder flip flops, yet to be described.

At any time that a picture edge signal occurs having a magnitude providing a predetermined difference from a preceding picture edge signal, edge reset signal GRE is generated and coupled to the camera control circuit CC in such a way as to stop the horizontal and vertical scanning counters at the point in the cycle of the scanning counters at which the picture edge was detected.

As will be seen, the edge scan signal CSE produced by the camera control CC is derived from the edge scanning pulse CPE and is coupled to the edge position coder PC. As will be described, the edge position coder is a flip flop type of counter which is driven by the edge scan signal CSE. The edge scan signal CSE, as will be seen in FIG. 8, operates synchronously with the edge scanning pulse CPE and is also stopped with the occurrence of the edge reset signal GRE. Thus, the edge position coder counter PC remains in the electrical configuration in which the scanning counters and the beam have been stopped. As will be described, the edge position counter PC comprises four or five flip flops, depending upon the application, and produces output signals P1 to P5 and $\overline{P1}$ to $\overline{P5}$ (for the five flip flop counter) which are coupled to the output register OR.

The brightness bit signals (the B signals) and the position bit signals (the P signals) are gated in parallel to respective flip flops in the output register OR by a read signal RD generated by a read flip flop in the output register under the control of a read pulse CPR generated by the timing generator once in each scan cycle. Thereafter, serial readout of the output register is initiated and enabled by the read flip flop under the control of a readout pulse CPO. The transmit pulse CPT which is the same frequency as the readout pulse CPO but delayed in time now operates to switch the output circuit of the output register. The output circuit of the output register OR is coupled by means of an "or" gate OG8 to the input of a transmitter T for transmission to the receiver system, yet to be described. The transmitter T selectively transmits two subcarriers, one for the coded high frequency components and the other for the coded low frequency components under the control of transfer signals $\overline{TR}$ and TR respectively.

Figure 2:
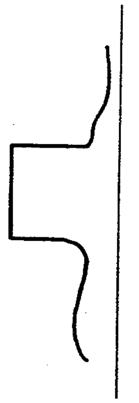
Figure 3:
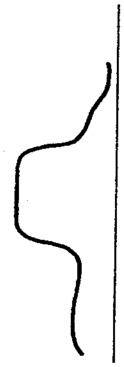
Figure 4:
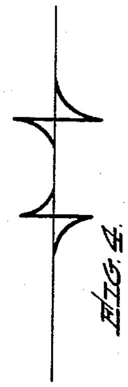

As will be seen by reference to FIG. 2, a typical picture or video signal may aproximate a square wave having high frequency characteristic leading and trailing edges and having a lower frequency characteristic intermediate portion. FIG. 3 depicts the low frequency components of the video signal and FIG. 4 depicts the high frequency components. The high frequency components resulting from the stop-scan edge detection mode of operation, as described hereinabove, have been detected, quantized and transmitted.

After the picture has been completely scanned in the stop-scan edge detection mode, the signal $\overline{TR}$ switches to the lower of its two voltage states and the signal TR switches to the higher of its two voltage states, indicating the beginning of the second or "lows" scanning cycle of the same picture. The picture is now scanned for the low frequency components and the gated video signal is now coupled to the input circuits of a digital lows coder, generally designated LC which has an output circuit coupled via the "or" gate OG to the input of the transmitter T. Video signal sampling is under the control of readout signal CPO.

The output signal LCS (see FIG. 8) of the digital lows coder LC is also a quantized signal. However, only two bits are required to satisfactorily and adequately quantize the low frequency components. Here, again, provision is made for eliminating the transmission of redundant low frequency picture or video signal information and only the two bit quantized output representing a difference in the low frequency signal of a predetermined magnitude, positive or negative, is coupled to the transmitter T.

During the low frequency scanning mode of operation of the system the camera control circuit is controlled by means of the low frequency scan pulse CPL which, as will be seen by reference to FIG. 8, operates at about twice the frequency of the edge pulse CPE. Thus, the scanning rate during the low frequency scanning mode of operation is operated at a higher rate and, unlike the scanning beam operation during the stop-scan edge detection mode of operation, beam scan is now continuous at the constant rate provided by the lows scanning pulse CPL.

*Receiving system*

Figure 5:
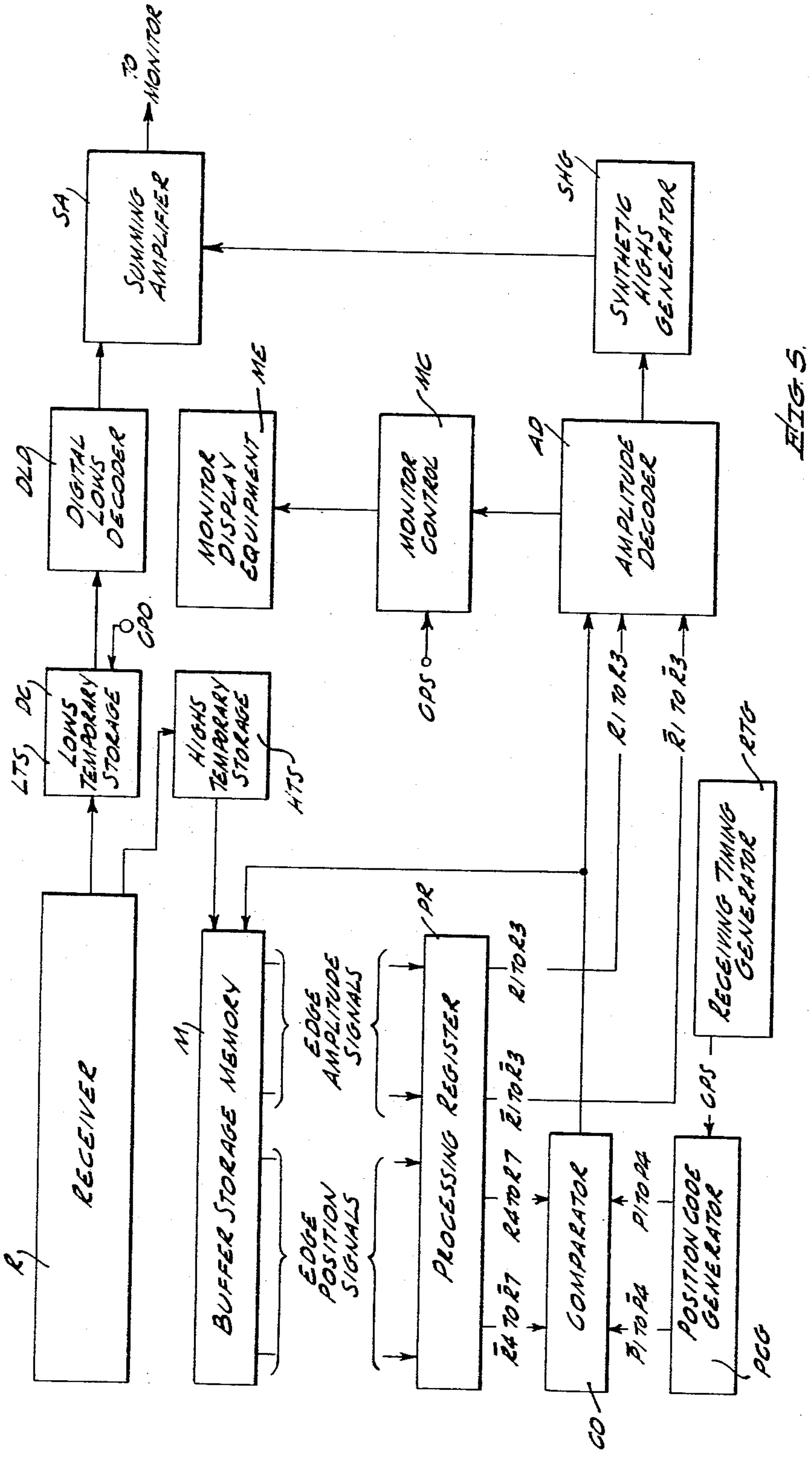

The signal information transmitted at the transmitter, as described, is in sequential form with all of the high signal information being serially transmitted during a first time period, and all of the lows signal information being serially transmitted in a second time interval. Since the high frequency components of the picture or video signal are not transmitted at a constant rate, separate temporary storage facilities are required in the receiver system to hold the coded "highs" and "lows" signals until they can be transferred into suitable receiver circuits. Since the transmitter transmits the high frequency components on one subcarrier and the low frequency components on a second subcarrier, the receiver must include separate circuit facilities for detecting the different subcarriers. As seen in FIG. 5, these separate detector circuits include separate output circuits which are connected inputwise to respective high and low coded signal temporary storage devices HTS and LTS, respectively. These may be constant speed magnetic tapes, for example, each having the capacity for storing a full frame of coded picture signals. The output circuit of the temporary storage device HTS is coupled to the input circuit of a buffer storage memory M. The output circuit of the temporary storage device LTS is coupled to the digital lows decoder DLD. The digital lows decoder circuit DLD converts the coded signals it receives from the temporary storage device LTS to analog output signals which are coupled to one input circuit of a summing amplifier SA.

The receiving system is controlled by means of a receiver timing generator RTG which is utilized to produce the signals CPS and CPO which may be synchronous with the signals CPS and CPO produced by the transmitter timing generator TG although this is not necessary. The signal CPS drives a position code generator PCG which, like the edge position coder PC of the transmitting system, may comprise a plurality of flip flops corresponding in number to those in the position coder PC of the transmitter. The counter PCG, being driven by the signal CPS, changes its count indicating configuration with each pulse CPS. The output of this counter, represented in signals P11 through P14 and $\overline{P11}$ through $\overline{P14}$, is coupled to a comparator circuit CO which may comprise a plurality of "and" and "or" gates, as will be described at a later point.

The buffer storage memory has sufficient capacity to store all of the signal information concerning the high frequency components of the picture or video signal which has been transmitted by the transmitter. Thus, in sequence, the buffer storage memory contains the brightness bits (the B, $\overline{B}$ signals) and the position bits (the P, $\overline{P}$ signals) for each picture edge signal which has been transmitted during a single picture frame. By providing sequential access to the information stored in the buffer memory, it is therefore possible to read out the signal information on the high frequency components of the signal in exactly the order in which it was entered into the buffer storage memory M. This is accomplished in a control provided by the output of the comparator circuit CO, as will be described.

Processing of the information in the receiving system is achieved by means of a processing register PR, comprising a plurality of flip flops sufficient in number only to store the groups of signals representing the quantized values of edge amplitude and edge position for a single edge signal. The processing register is designated PR and the buffer memory has its output circuits for edge amplitude signals and edge position signals coupled to the processing register PR, as shown. The output of the processing register, which in this instance comprises seven flip flops, is represented in signals R1 to R3 and $\overline{R1}$ to $\overline{R3}$ for the brightness bits, quantizing the edge amplitude of the video signal, together with R4 to R7 and $\overline{R4}$ to $\overline{R7}$, quantizing the instant position of the particular picture edge.

The quantized position signals in the output of the processing register PR are coupled to the comparator CO and compared with the output signals of the position code generator PCG. When the signals are the same the comparator circuit produces an output signal which is coupled to an amplitude decoder, generally designated AD. The amplitude decoder includes additional input circuits sufficient in number to receive the brightness bits R1 to R3 and $\overline{R1}$ to $\overline{R3}$ of the picture edge from the processing register PR. Thus, at such time as there is an output of the comparator circuit coupled to the amplitude decoder the amplitude decoder is enabled to produce an output signal which is the analog equivalent of the quantized input. This is a waveform representing the magnitude or amplitude of the edge signal. The synthetic highs generator now responds to the edge signal to generate a signal corresponding to one of the two signals illustrated in FIG. 4 which is the "highs" output signal. This signal from the synthetic highs generator is coupled to the other input terminal of the summing amplifier SA, as indicated.

The synchronous application of the "highs" signal from the synthetic highs generator with the corresponding "lows" signal from the digital lows decoder DLD is under the control of the timing signals CPO and CPS. With the occurrence of each signal CPO, the information in the temporary storage LTS in the form of quantized signals representing the low frequency components of the picture or video signals, are now coupled to the digital lows decoder DLD in synchronism with the output of the synthetic highs generator SHG. The output of the summing amplifier SA is the synthesized picture or video signal representing a particular signal VS from the camera CA. This signal is coupled to any suitable type of television monitor display equipment ME which is synchronized by the monitor control circuit MC, which, in turn, is controlled by the scan pulse CPS and a synchronizing signal generated by the amplitude decoder AD and representing a line end or a frame end. This synchronizing signal as will be described is a specific configuration of R3.$\overline{\text{R}}$2.R1 in response to signals B3.$\overline{\text{B}}$2.B1 at the transmitter, as initiated by the video end signal GVE.

SPECIFIC TELEVISION SYSTEM

The television system will be better understood by reference to more specific illustrations of the system elements. In this case reference is made to FIGS. 6*a* and 6*b* illustrating the transmitter system in greater detail.

*Camera control*

Figure 6A:
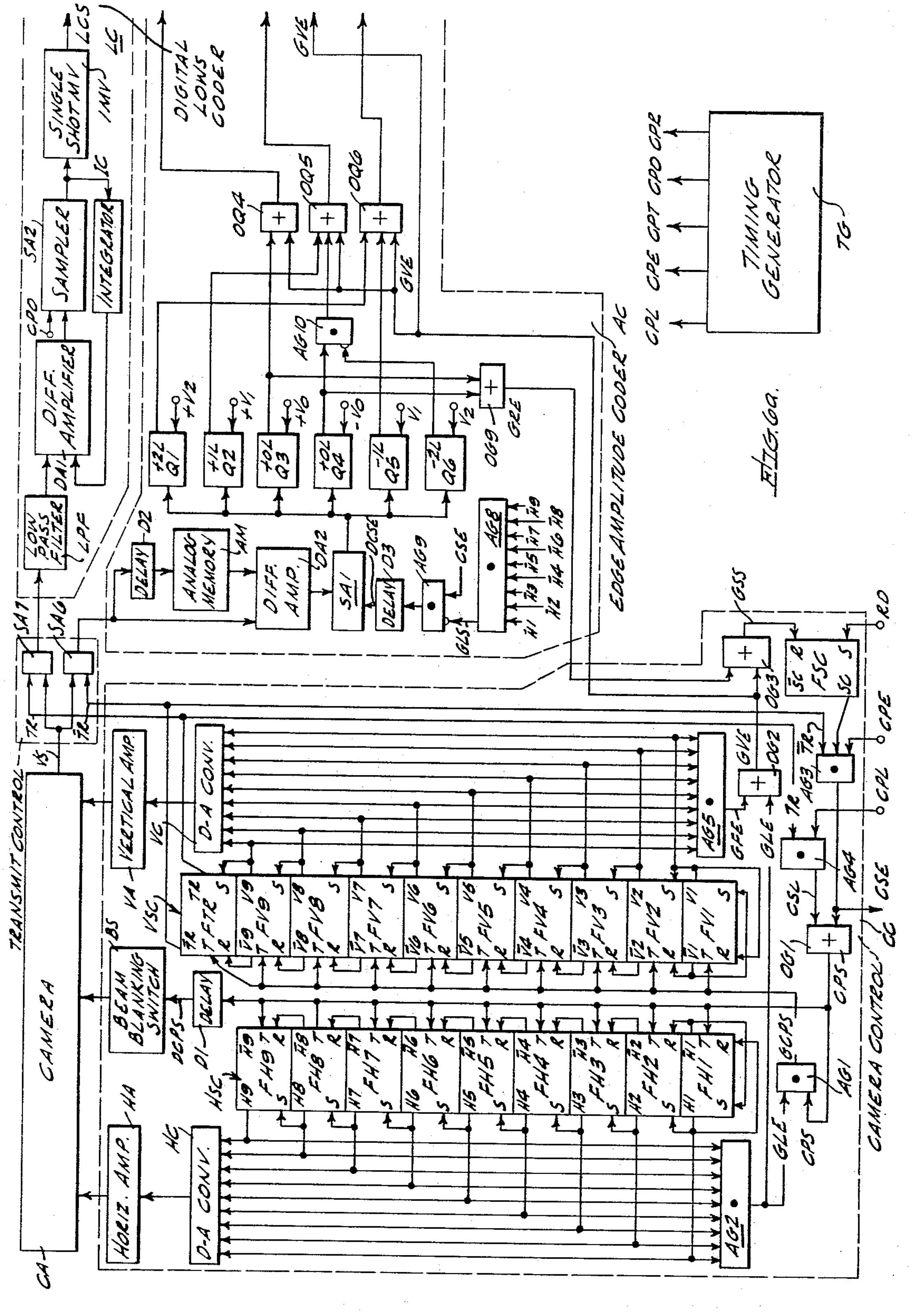
Figure 6B:
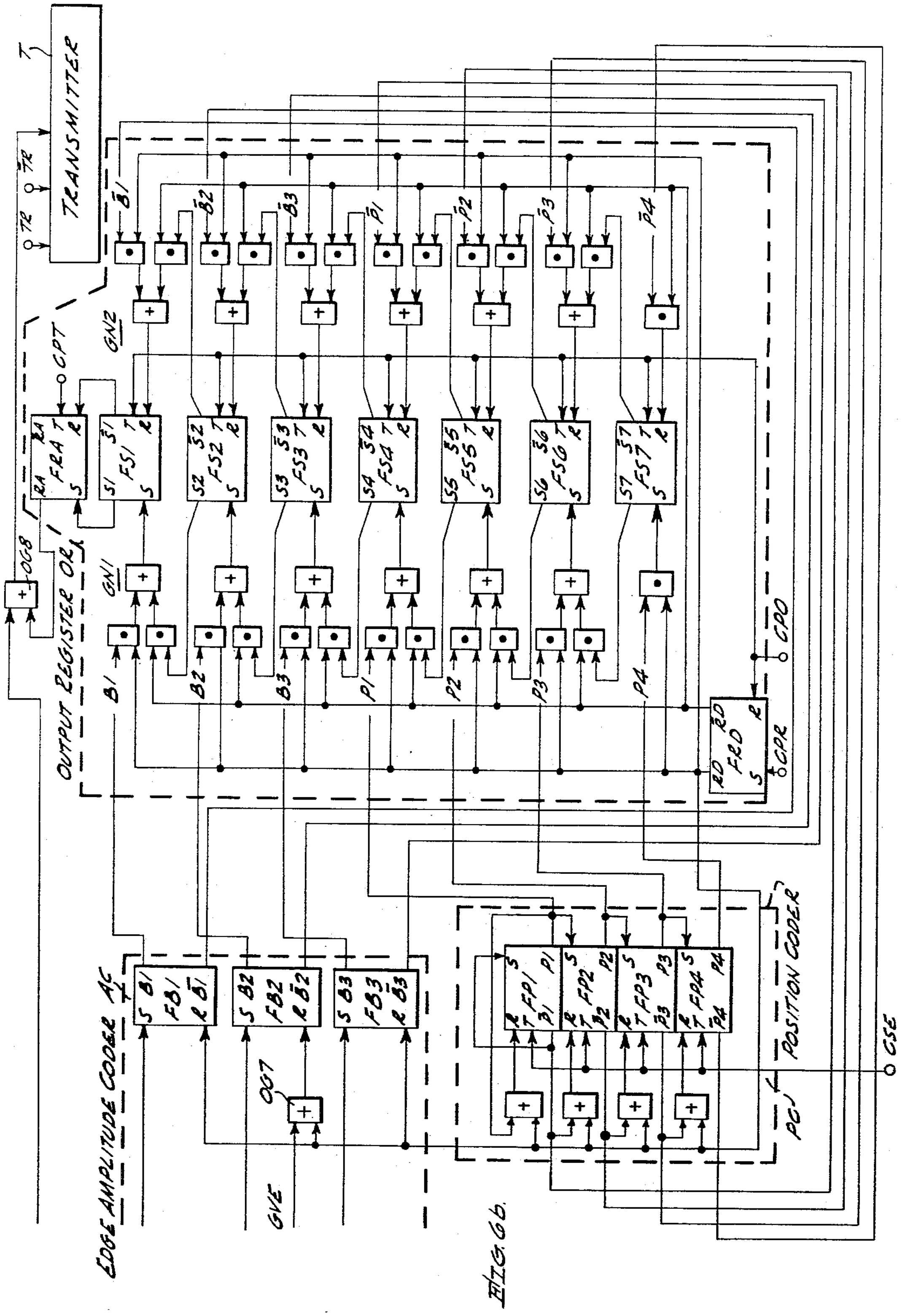

As will be seen by reference to FIGS. 6*a* and 6*b*, the camera CA is controlled by the camera control circuit which includes a horizontal scan counter HSC and a vertical scan counter VSC. The horizontal scan counter comprises nine flip flops each having set and reset input circuits designated S and R, respectively, and a pair of output circuits, the H and $\overline{\text{H}}$ output circuits. Additionally each flip flop has a trigger input circuit which is designated T.

Figure 9:
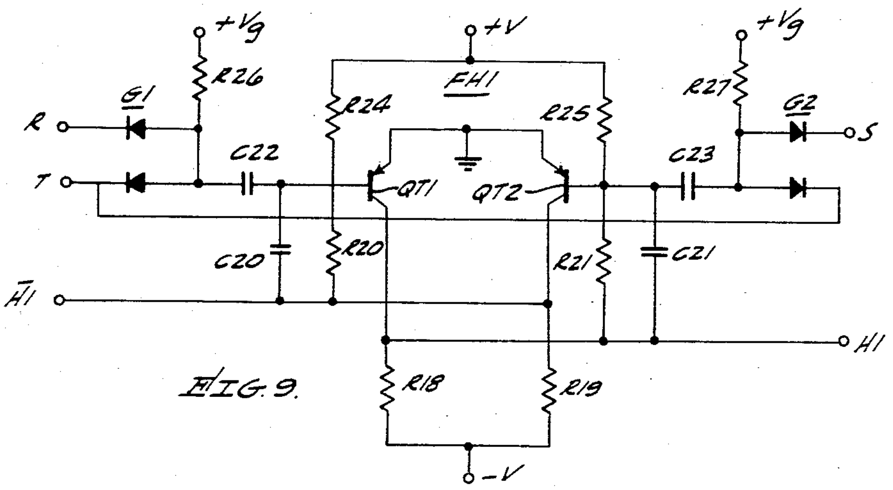
FIG. 9 is a circuit illustrating in detail a flip flop of a type employable in this invention.
Figure 10:
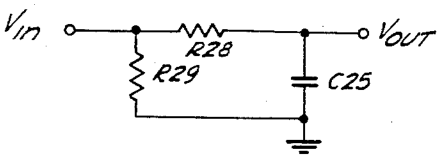
FIG. 10 is an analog type of memory circuit employed herein.

These flip flops, as will be seen by reference to FIG. 9 which illustrates the circuit of the flip flop FH1, in detail, is typical of all of the flip flops. Each flip flop comprises a pair of transistors QT1 and QT2 of the n-p-n variety which are coupled in common or grounded emitter configuration. The respective collector circuits of these transistors are coupled through suitable resistors R18 and R19 to a common source of negative potential as indicated. Cross coupling networks, including respective capacitors C20 and C21 and respective resistors R20 and R21, cross couple the base and collector circuits of the respective transistors. Resistors R24 and R25 respectively couple the base circuits to a common positive power supply or source. Coupling capacitors C22 and C23 are connected in series in the signal input circuits to the respective bases and the output of respective "and" gates G1 and G2 are coupled to the capacitors C22 and C23. Each of the "and" gates comprises two input terminals. The "and" gate G1 is provided with coupling diodes coupling the terminals R and T respectively to the input capacitor C22 and the "and" gate C2 comprises coupling diodes coupling the input terminal S and the terminal T to the coupling capacitor C23. These "and" gates are arranged to couple positive going signals and to this end are provided with respective pull-up resistors R26 and R27 which are each coupled to suitable positive power supplies Vg as indicated. The output terminals of this flip flop are respectively designated H1 and $\overline{\text{H1}}$ and for the purposes of this discussion it will be assumed that the flip flop is in its "1" representing electrical state whenever the terminal H1 is in the higher of its two voltage states and the flip flop will be assumed to be in its "0" representing electrical state whenever the terminal $\overline{\text{H1}}$ is in the higher of its two electrical states.

When the terminal H1 is in the higher of its two electrical states, the transistor QT1 is conductive. Thus for the circuit illustrated the terminal T1 will be very close to ground potential. Under this condition the transistor QT2 is cut off and the terminal $\overline{\text{H1}}$ is in the lower of its two electrical states which is an electrical state approaching the value of the negative power supply coupled to resistor R21, for instance. When it is desired to change the electrical state of the flip flop, a signal may be applied simultaneously to the input terminals T and R. The positive going output of the "and" gate coupled to capacitor C22 in the base circuit of the transistor QT1 cuts off this transistor. The cross coupling provided by the cross coupling network now drives the transistor QT2 to conduction as transistor QT1 cuts off. Thus the electrical output of the terminal $\overline{\text{H1}}$ switches to the higher of its two electrical states as the electrical output of the terminal H1 switches to the lower of its two electrical states.

If the input circuits of the "and" gates coupled to the terminal T are eliminated, this flip flop may be switched by the selective application of positive going input voltages to the terminals S and R.

Referring back to the horizontal scan counter HSC of FIG. 6*a*, it will be seen that the respective flip flops FH1 through FH9 are coupled in cascade. That is, the output terminal H1 is coupled to the input terminal S of flip flop FH2. The output terminal $\overline{\text{H1}}$ is coupled to the input terminal R of the flip flop FH2 and so on through flip flop FH9. Additionally, the output terminal H1 is coupled to the input terminal R of flip flop FH1 and the output terminal $\overline{\text{H1}}$ is coupled to the input terminal S of flip flop FH1. A scan or clock pulse signal CPS derived from the output of an "or" gate OG1, as will be described at a later point, is coupled to each of the T input terminals of the flip flops FH1 through FH9. Thus the flip flop FH1 is triggered from one electrical state to the other with each application of the scan pulse CPS and the remaining flip flops in this counting chain are triggered between their electrical states by selected scan pulses CPS, in dependence upon the electrical state of the preceding flip flop in the counter. With these circuit connections the horizontal scan control HSC counts in a conventional binary manner and has a counting capability of 512 bits which in the instant application constitutes the number of dots or elements in a complete line of the screen of the camera tube which contains the picture information.

The vertical scan counter VSC is similarly connected and also includes 9 flip flops. These are identified FV1 through FV9. The vertical scan counter VSC is driven by a gated scan pulse GCPS which is the output of an "and" gate AG1. This signal is produced by the scan pulse CPS when "and" gate AG1 is enabled by the output of "and" gate AG2. "And" gate AG2, having its input circuits coupled to the output terminals H1 to H9 of the flip flops of the horizontal scan counter HSC, is enabled each time the horizontal scan counter control HSC reaches a full count, that is, that time when all of the output terminals H1 to H9 of the horizontal scan counter are in the higher of their two voltage states. The output of the "and" gate AG2 which may be termed a line end signal is designated GLE and is the enabling signal on the "and" gate AG1. Thus at the end of each line the next occurring scan pulse CPS is gated at the gated scan pulse GCPS which steps the vertical scan counter one count. Thus, scanning takes place a line at a time beginning at the top of the camera tube screen, in keeping with conventional practice, and, at the end of the first line of scan the vertical scan counter VSC is stepped one count to deflect the scanning beam downwardly to the next line. Inasmuch as nine flip flops are also provided in the vertical scan counter, 512 lines may be scanned in the arrangement described. This provides scanning of a square area on the screen of the camera tube which is suitable for these purposes. To obtain, compatibility with conventional rectangular screen configurations, the counter configuration may be changed to provide the required rectangular scanning pattern.

As will be seen, the "H" and "V" output terminals of each of the horizontal and vertical scan counters are coupled as inputs to respective digital-to-analog converter circuits HC and VC respectively. These circuits may be conventional resistor ladder weighter circuits which receive the quantized inputs and produce a representative analog output voltage. The staircased output voltage of the horizontal converter HC is used to control the horizontal sweep of the camera tube beam and the staircased or stepped output of the vertical control circuit VC controls the vertical sweep of the beam. A horizontal amplifier HA receives the output of the digital-to-analog converter HC and has its output coupled to the horizontal beam deflection system of the camera. Similarly a vertical amplifier VA receives the output of the vertical converter VC and has its output coupled to the vertical beam deflection system of the camera.

An additional control is provided on the scanning beam of the camera 2. This is a beam blanking control provided by the output of a beam blanking switch BS. The beam blanking switch is controlled by the output of a suitable delay circuit D1 timing removal of the blanking signal to permit scanning of an element of a picture each time the counter HSC is stepped. To this end, the delay circuit is also controlled by the signal CPS. Thus unblanking takes place in delayed synchronism with beam stepping.

The scan pulse CPS which, as described, is the output of the "or" gate OG1 in the stop-scan edge detection mode of operation, is generated by means of the signal CSE which is the output of an "and" gate AG3. "And" gate AG3 has three input terminals. These input terminals are coupled respectively to the output terminal $\overline{TR}$ of a transfer flip flop FTR, to the output terminal SC of a scan control flip flop FSC and to an edge pulse output circuit CPE of a transmitter timing generator TG. With the terminals SC and $\overline{TR}$ in the higher of their two voltage states, the "and" gate AG3 is enabled and gates the edge pulse CPE producing the edge scanning pulse CSE. The edge pulse CPE, as will be seen by reference to FIG. 8, is a pulse occurring at constant intervals of time. Any time that either of the output terminals $\overline{TR}$ or SC are in the lower of their two voltage states, the "and" gate AG3 is disabled and the signals CPE are not gated. Hence, by the simple expedient of changing the electrical state of the scan control flip flop FSC the gate AG3 may be disabled so that the scan or clock pulse signals CPS are stopped. The scan control flip flop, is used to stop the scan at any time that a picture edge of predetermined magnitude different than the magnitude of an immediately preceding picture edge is detected, as will be described at a later point.

When flip flop FTR is in its TR electrical state, "and" gate AG3 is disabled and "and" gate AG4 is enabled. The "lows" scanning operation is now begun under the control of the "lows" pulse CPL. The "lows" scanning signal CSL produced by "and" gate AG4 which is coupled to "or" gate OG1 produces scan pulse CPS. Scanning at a constant rate controlled by the frequency of lows pulse CPL now takes place.

An "and" gate AG5 is coupled to the "V" output terminals of the flip flops FV1 to FV9 of the vertical scan counter VSC and gates a frame end signal GFE when all terminals are in the higher of their two voltage states. The frame end and line end signals GFE and GLE are gated by an "or" gate OG2 producing a video end signal GVE. The video end signal is gated by an "or" gate OG3 to the R input terminal of the scan control flip flop FSC, resetting this flip flop to stop the scan in the stop-scan edge detection mode of operation. The "or" gate OG3 also receives edge reset signal GRE which is used to reset the scan control flip flop FSC when a predetermined edge difference is detected. The video end GVE is also used as a control signal for the edge amplitude coder to produce a synchronizing signal at line or frame end. as will be described at a later point.

*Transmit control*

The transfer flip flop FTR is controlled by the output of the flip flop FV9 of the vertical scan counter and is switched between its TR and $\overline{TR}$ electrical states by the gated scan pulse GCPS at any time one of the terminals V9 or $\overline{V9}$ is in the higher of its two voltage states. For the convention adopted, the terminal $\overline{TR}$ is in the higher of its two voltage states at the beginning of each stop-scan edge detection mode of operation. It will be recalled that it was in this mode of operation that the high frequency components of the picture or video signals are to be detected, quantized and transmitted. When the terminal $\overline{TR}$ is in the higher of its two voltage states, sampler SA6 of the transmit control circuit TC is enabled and couples the video signal VS from the camera CA to the input circuits of the edge amplitude coder circuit AC. When the terminal TR is in the higher of its two voltage states, sampler SA7 is enabled and couples the video signal VS to the input circuits of the digital lows coder circuit LC. A circuit typical of all sampler circuits herein appears in FIG. 16 and is described at a later point.

*Edge amplitude coder*

The output of the sampler SA6 is coupled to the input circuit of an edge detector circuit forming part of an edge amplitude coder AC. The edge detector circuit comprises a delay circuit D2, an analog memory AM and a difference amplifier DA1. This input circuit has two branches, the first of which is coupled to the delay circuit D2 of any conventional type which together with the analog memory circuit AM, the details of which are yet to be described, to which the output of delay circuit D2 is connected, produces a total delay less than the shortest time interval of recurrence of the video signal VS. Thus the output of the analog memory AM exists at the same time that the second video signal is coupled to the input of the analog coder AC. The output of the analog memory AM is coupled to one input circuit of a difference amplifier DA1, the other input of which receives the undelayed video signal. The difference between the two video signals is amplified by the difference amplifier DA1 which may be any suitable type of differential amplifier and the output of amplifier DA1 is coupled to the input terminal of the voltage sampler SA1. The other input terminal of the sampler SA1, which is the bias terminal, is controlled by the delayed output of a gating system receiving its electrical inputs from the "$\overline{H}$" terminals of the horizontal scan counter flip flops. These "$\overline{H}$" terminals, as indicated, are coupled to the respective input circuits of a nine input terminal "and" gate AG8. In this configuration of the horizontal scan counter HSC which is actually the zero count configuration, the scanning of a line of picture information has just been concluded and the scanning of a new line of picture information is about to begin. The output of the "and" gate AG8 may be identified as a line scan signal GLS which indicates that a line scanning operation is about to begin. The signal GLS is coupled to one input terminal of an "and" gate AG9 having coupled to its other input terminal the edge scan signal CSE developed in the camera control circuit CC, as described. The semi-circle at that input terminal of "and" gate AG9 coupled to the output terminal of "and" gate AG8, denotes inversion of the input signal. Thus at any time that "and" gate AG8 is enabled, the inversion of its output signal disables "and" gate AG9. Thus the only time that "and" gate AG9 is disabled throughout a counting cycle of the scanning counter is when the horizontal scan counter is in its zero count configuration. At all other times during the count, and hence the scanning cycle, the "and" gate AG9 is enabled. Pulses CSE are therefore gated to the delay circuit D3. The delayed pulses DCSE act as switching pulses on the sampler SA1 which couples the output of the difference amplifier DA1 to the respective inputs of six quantizer circuits Q1 through Q6, respectively.

Figure 13:
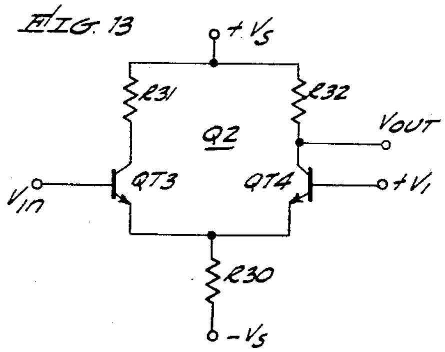
FIG. 13 illustrates a quantizer circuit of the type employed in the edge amplitude coder of this invention.

Quantizer circuits Q1, Q2 and Q3 receive respective input voltages designated +V2, +V1 and +V0 of sequentially diminishing magnitude. Quantizer circuits Q4, Q5 and Q6 receive input voltages —V0, —V1 and —V2 respectively of sequentially increasing negative value. These respective voltages, as will be seen by reference to FIG. 13 illustrating the typical details of the quantizer circuits, yet to be described, constitute the reference or threshold voltage levels of the quantizer circuit.

The outputs of the quantizers Q1 through Q6 are coupled as inputs to a gating network comprising an "and" gate AG10 and three "or" gates OG4, OG5 and OG6. The output of "or" gate OG4 is coupled to the "S" input terminal of a flip-flop FB1. The output of "or" gate OG5 is coupled to the "S" input terminals of flip-flop FB2 and the output of "or" gate OG6 is coupled to the "S" input terminals of flip-flop FB3. Thus the outputs of these "or" gates are instrumental in respectively setting the flip-flops FB1 through FB3 in their "1" or "B" representing electrical states. The "and" gate AG10 receives the outputs of quantizer circuits Q4 and Q6, the output of quantizer Q6 being coupled to the inverting terminal of the "and" gate. This "and" gate AG10 is a negative gate and the output may be switched positive for application to "or" gate OG5 by means of a suitable transistor switch, the output of the quantizer circuit Q6 being inverted normally enables that particular terminal of the "and" gate AG10. Thus the "and" gate will produce an output at any time that the difference amplitude of a pair of sequentially occurring video signals VS exceeds the bias voltage level —V0 and is less negative than the bias level established at quantizer Q6 by the reference voltage —V2.

The table below shows the flip-flop configurations for the range of difference amplitudes of video edge signals.

| | FB3 | FB2 | FB1 |
|---|---|---|---|
| Vin >+V2 | 1 | 1 | 1 |
| Vin>+V1 | 0 | 1 | 1 |
| Vin>+V0 | 0 | 0 | 1 |
| Reset (RD) | 0 | 0 | 0 |
| Vin <—V0 | 0 | 1 | 0 |
| Vin <—V1 | 1 | 1 | 0 |
| Vin <—V2 | 1 | 0 | 0 |
| Sync. (GVE) | 1 | 0 | 1 |

In this table $Vin<V0$, for instance indicates V*in* is more more negative than the indicated reference voltage.

Thus, seven of the eight possible configurations of the flip-flops FB1 through FB3 are used to code or quantize the magnitude of the difference edge signal from maximum positive to maximum negative values. The synchronizing state of the flip-flops, which is the eighth configuration, which may be assumed by the flip-flops, is represented in the configuration 101 for the flip-flops FB3, FB2 and FB1 in the order named and results from the application of the signal GVE.

The flip-flops FB1, FB2 and FB3 are reset by the output of a read flip-flop FRD forming part of the output register OR, the details of which are yet to be described. To this end, the terminal RD of the flip-flop FRD is coupled to the reset terminals R of the flip-flops FB1 and FB3, and is additionally coupled to one input terminal of an "or" gate OG7, the output terminal of which is coupled to the reset terminal R of flip-flop FB2. The other input terminal of "or" gate OG7, as well as the remaining input terminals of each of "or" gates OG4 and OG6 are coupled to the output of the "or" gate OG2 in the camera control circuit CC and are controlled by the video end signal GVE as indicated. The video end signal GVE is produced when either the line end signal GLE or the frame end signal GFE occurs.

A gate OG9 which may be an "or" gate has two input circuits coupled to the output circuits of the two lower level quantizers Q3 and Q4, respectively. With the occurrence of a difference edge signal having a magnitude exceeding the thresholds of these quantizers a gated edge reset signal GRE is produced by gate OG9. The output of gate OG9 is coupled to one input terminal of "or" gate OG3 in the camera control circuit CC producing the gated stop signal GSS as indicated which resets scan control flip-flop FSC to stop the scan.

*Output register*

The output shift register OR comprises seven signal receiving and shifting flip-flops FS1 through FS7. Flip-flops FS1 through FS3 receive the brightness bits of the flip-flops FB1 through FB3 which code the magnitude of the edge amplitude signal. Flip-flops FS4 through FS7 receive the electrical outputs of the position coder flip-flops FP1 through FP4 which, it will be recalled, are used to code the beam position within individual scan intervals.

These flip-flops are parallel coupled for read in or shift in purposes and are serially coupled for read out or shift out purposes. This selective parallel-serial coupling is controlled by respective gating networks GN1 and GN2, each comprising respective "and" gate pairs coupled by individual "or" gates to the respective input terminals S and R of the flip-flops. One "and" gate of each "and" gate pair of the gating network GN1 receives a "B" or "P" signal from the flip-flops of the edge amplitude coder and position coder, respectively, and one "and" gate of each "and" gate pair of the gating network GN2 receives a "$\overline{B}$" or "$\overline{P}$" signals from the flip-flops of the amplitude and position coders. Whenever the read flip-flop FRD is in its RD electrical state these "and" gates of both of the gating networks are enabled. This is the read electrical state of the read flip-flop FRD and is achieved by the application of the read pulse CPR generated by the transistor timing generator TG once in each scanning interval or cycle at which time the flips FS1 to FS7 are set in correspondence with the setting of the flip-flops FB1 to FB3 and FP1 to FP4.

With the next occurrence of a signal CPO the read flip-flop FRD is switched to its $\overline{RD}$ electrical state. This disables the first set of "and" gates through which the quantized amplitude and position signals were coupled to the output register flip-flops and enables the remaining "and" gate of each "and" gate pair so that the flip-flops are now coupled in cascade or in series. Thus, the output register is coupled from a parallel input configuration to a serial type of output configuration under the control of the read signal CPR and the read-out signal CPO.

The signal CPO is also coupled through the indicated circuits to the T input terminals of each of the flip-flops FS1 through FS7. Since the output terminals of the flip-flop FS7 control the input terminals of the flip-flop FS6, etc., through the flip-flop FS1 the application of read-out signal CPO now operates to sequentially transfer the electrical state of one flip-flop to an adjacent flip-flop in a direction proceeding from the higher numbered flip-flops to the lower numbered flip-flops, the flip-flop FS1 representing the output of the storage flip-flops of the shift register.

The output of the flip-flop FS1 controls the inputs of a flip-flop FRA which is controlled by a transmit pulse CPT. As will be seen by reference to FIG. 8, a pulse CPO is instrumental in shifting information in the shift register which sets the output flip-flop FS1 in a particular electrical state depending upon the previous electrical state of the flip-flop FS2. After the flip-flops have settled down and just prior to the next read-out pulse CPO the transmit pulse CPT which operates in phase displaced synchronism with the read-out pulse CPO is coupled to the T input terminal of the flip-flop FRA causing this flip-flop to change its electrical state. The output of the flip-flop FRA is coupled through an "or" gate OG8 to the transmitter T.

As will be seen by reference to FIG. 8, there are seven read-out or shift-out pulses CPO between consecutive read pulses CPR. Similar considerations apply to the transmit pulses CPT. Thus, during the interval between the read pulses CPR the phase displaced synchronous operation of the read-out pulse CPO and transmit pulse CPT is instrumental in shifting the information in the output register serially to the input circuits of the transmitter T. The next occurrence of the pulse CPR sets the flip-flop FRD in its RD electrical state and the RD signal resets and reads out all of the flip-flops of the position coder and of the amplitude coder. At the same time the signal RD is coupled to the S or set input terminal of the scan flip-flop FSC to switch this flip-flop to its SC electrical state so that beam scanning in the stop-scan edge detection mode of operation may again be initiated. Thus, all of the circuits of the edge amplitude coder and the position coder are read out and reset so that additional information on the edge amplitude signals may be quantized, read out and subsequently shifted out to the transmitter as described.

*Digital lows coder*

When the picture frame end is reached in the stop-scan edge detection mode of operation the transfer flip-flop FTR is switched to its TR electrical state which enables the sampler SA7. Gated video signals are now coupled to the input of the digital lows coder circuit LC which comprises an input circuit receiving the gated video signals including a low pass filter LPF which passes the low frequency components of the picture signal. The output of the low pass filter is coupled to one input terminal of a differential or difference amplifier DA2, the output terminal of which is coupled to one input terminal of a sampler circuit SA2, the other input terminal of which receives the read-out signal CPO which effectively "gates" the sampler, as described hereinafter. The output of the sampler is coupled to the input of a single-shot multivibrator IMV and is also fed back to the other input of the difference amplifier through an integrator circuit IC. The timing in the feedback loop is such that the integrated output of the multivibrator is always compared with the next following filtered video signal from the low pass filter LPF. This form of circuit is known as a delta modulator and provides a two-bit code for digitally coding the low frequency components of the video signal. In this regard, if the difference signal is positive the single-shot multivibrator will be switched to its "1" representing electrical state. If the difference between the applied video signal and the integrated output of the sampler SA2 is negative the multivibrator remains in its normal electrical state. Thus, the "1" and "0" electrical states of the multivibrator IMV provide an adequate code of low frequency components of the video signal. The "low" coder output signal LCS (see FIG. 8) is now transmitted by the transmitter T on the "lows" sub carrier since the signal TR is now in the higher of its two electrical states.

SPECIFIC RECEIVING SYSTEM

*Receiver*

The receiving system includes a receiver R which may be any conventional type of receiver. Inasmuch as the lows and the highs are transmitted on different subcarriers, provision is made in the receiver for detecting the different subcarrier frequencies. The output of the receiver, therefore, comprises two output circuits, one of which carries the "lows" signals and the other of which carries the "highs" signals. The lows output circuit is coupled into a lows temporary storage circuit LTS and the highs output circuit is coupled into a highs temporary storage circuit HTS.

*Temporary storage devices*

The temporary storage devices may be any conventional type of storage facility capable of receiving and storing the serially applied input signals. One type particularly useful is a magnetic tape type of storage device in which the magnetic tape, during the interval when input signals are coupled thereto, is driven at a substantially constant speed. Such tape storage systems are well known and are, therefore, not described herein.

The output of the lows temporary storage circuits is coupled into the input circuits of the digital lows decoder generally designated DLD. The output of the highs temporary storage is coupled directly to a buffer storage memory circuit generally designated M and having a storage capability sufficient to hold approximately a full frame of picture signals.

*Buffer storage memory*

The buffer storage memory may be a conventional magnetic core memory capable of serially receiving signals from the "highs" temporary storage device HTS and presenting these signals to a suitable output circuit for transfer to the processing register. Since the "highs" signals comprise signal groups or words each containing seven signal bits the register may comprise sufficient magnetic core rows each capable of storing seven bits of information to store a full frame of picture signal "highs," the information being serially transferred into the register on a row by row basis and being read out of each row in parallel. A conventional flip flop storage circuit may also be used. The rate of input of signals is greater than the rate of signal removal. The buffer storage memory has an output circuit coupled to a control input of the highs temporary storage device so that during readout operations the magnetic tape may be started and stopped under the control of the buffer storage memory circuit M, depending upon the amount of information in the memory. Thus, at no time will information be lost due to an attempt to apply more input than the memory is capable of holding. Likewise, timing will not be adversely affected by allowing the memory to become completely emptied before additional information is applied thereto. Distribution of signals from the temporary storage device may be achieved by a counter operated synchronously with the tape and controlling gates coupling the signals from the tape to selected points in the buffer memory.

*Processing register*

The output of the buffer storage memory M which comprises a plurality of readout circuits, as shown, is coupled to a corresponding plurality of input circuits of a processing register generally designated PR. This processing register comprises a plurality of flip flops designated FR1 through FR7, corresponding in number to the total number of flip flops in the edge amplitude coder circuit AC and the position coder circuit PC in the transmitter system. Flip flops FR1 through FR3 receive the edge amplitude signals and flip flops FR4 through FR7 receive the position signals. The edge amplitude and position signals for each edge are transferred in parallel from the buffer storage memory to the input circuits of the flip flops of the processing register to set these flip flops into electrical states corresponding to the signals from the buffer storage memory. This is all done under the control of a synchronizing signal derived from the output of a comparator circuit CO, forming part of the digital highs decoder, as will be described at a later point.

*Position code generator*

Figure 7A:
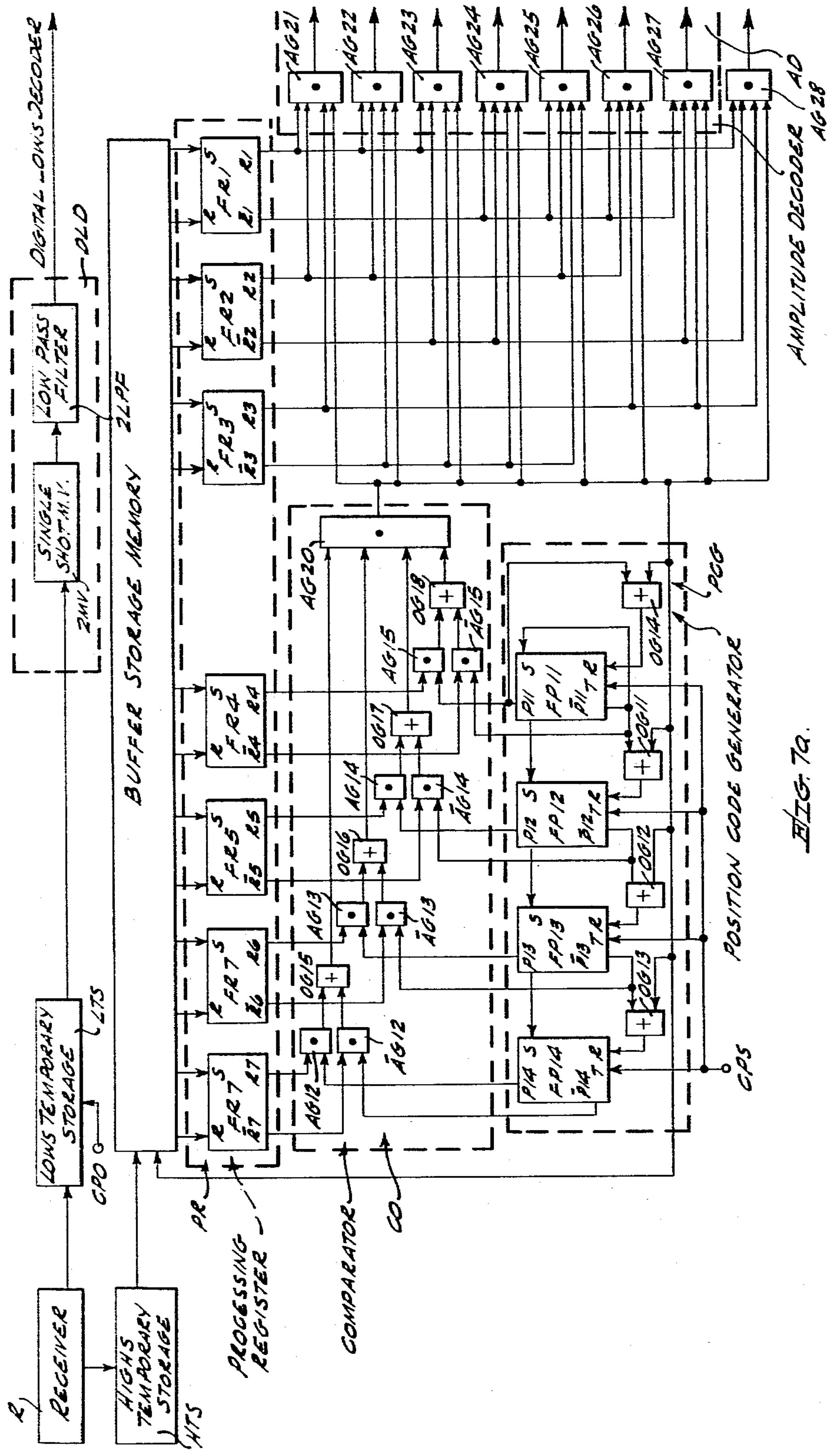
Figures 7B, 7C, 7D, 7E:
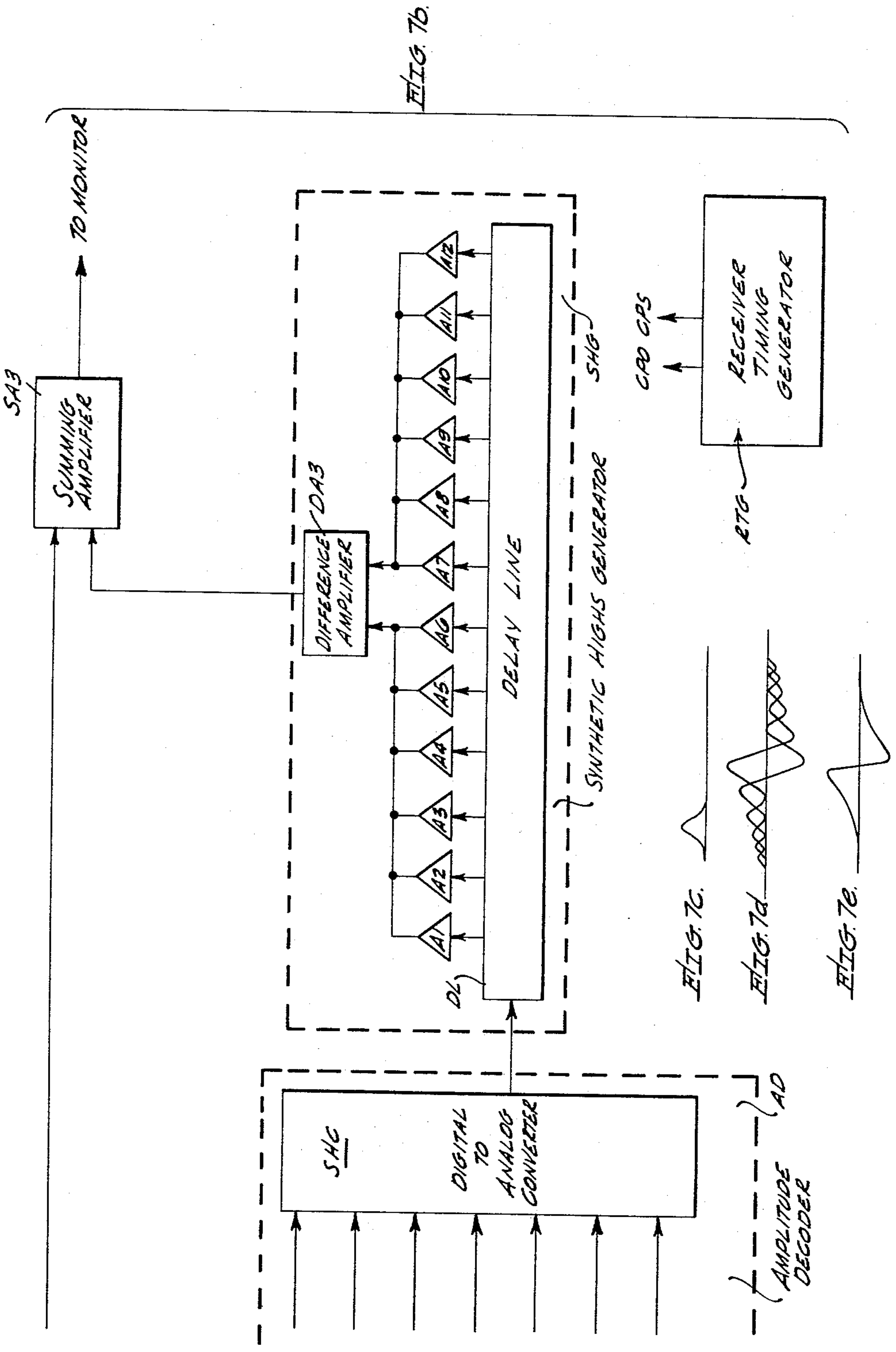

Position decoding of a particular edge is accomplished by means of a position code generator generally designated PCG, comprising four flip flops FP11 through FP14, corresponding for instance to flip flops FP1 through FP4 of the position coder PC in the transmitter. The flip flops of the position code generator are of a type illustrated in FIG. 9 and are here coupled in cascade to switch in accordance with a conventional binary code. Terminals $\overline{P}11$, $\overline{P}12$ and $\overline{P}13$ are coupled through "or" gates OG11, OG12 and OG13 to the reset input terminal R of the next higher order flip flop in the counting chain. On flip flop FP11 the output terminal P11 is coupled to the reset terminal R through an "or" gate OG14. The remaining input terminal of each "or" gate is coupled to the output of a comparator circuit CO; hence, resetting of the flip flops of this position code generator PCG takes place with each output of the comparator circuit CO. The flip flops are triggered by means of a signal CPS which may be synchronous with the scan pulse signal CPS at the transmitter. Such a signal may be produced by a receiver timing generator RTG as shown in FIG. 7*b*, which also produces a signal CPO.

*Comparator*

The output terminals, this is the P and $\overline{P}$ terminals of the flip flops FP11 to FP14 of the position code generator PCG, are coupled to respective input terminals of the respective pairs of "and" gates AG12, $\overline{A}$G12 to AG15, $\overline{A}$G15, as indicated, along with the corresponding R and $\overline{R}$ terminals of the flip flops FR4 through FR7 of the processing register so that the corresponding output terminals of correspondingly weighted flip flops in the position code generator PCG and the processing register PR are compared. The "and" gates are enabled in each case when the input voltages thereto are at gating level, which according to the convention adopted herein is the higher of the two voltage states of the flip flop output terminals. Each pair of "and" gates associated with the respective pairs of flip flops have their output circuits coupled to the corresponding input terminals of respective "or" gates OG15 to OG18, as indicated. Thus, at any time, for instance with reference to the flip flops FP11 and FR4, that the output terminals R4 and P11 are simultaneously in the higher of their two voltage states, the "and" gate AG15 receiving these output voltages is enabled and gates an enabling voltage to the "or" gate OG18 connected thereto to produce an output signal. The outputs of the four "or" gates OG15 to OG18 are coupled to four input circuits of the comparator output "and" gate AG20 and when these four input circuits are at gating level, indicating identity exists between the high voltage state of one output terminal of each of the four flip flops of the processing register with the corresponding output terminal of each of the four flip flops of the position code generator, an output signal is produced. The output circuit of this "and" gate as described above is coupled to one input terminal of each of the "or" gates interconnecting the flip flops of the position code generator. This output signal with the occurrence of the comparison, resets the flip flops of the position code generator. This output circuit is also coupled to an input circuit of the buffer storage memory to produce a control signal reading out the next signal information group or word identifying the position and amplitude of the next picture edge.

*Amplitude decoder*

The output of the comparator circuit is coupled to an input terminal of each of "and" gates AG21 through AG27, constituting the input circuits of an amplitude decoder circuit generally designated AD. The remaining input circuits of these "and" gates are connected to the R and $\overline{R}$ output terminals of the edge amplitude coder flip flops FR1 through FR3. The logical connection of these circuits is such as to provide input signal configurations at the respective "and" gates corresponding to the seven possible signal configurations, representing edge amplitude, in both positive and negative senses, as described in connection with the edge amplitude coder of the transmitter.

The outputs of the "and" gates AG21 through AG27 are coupled to the input circuits of a synthetic highs converter circuit, the output of which is a waveform having a magnitude corresponding to the amplitude of the difference edge signal and occupying a position in the monitor display system of the receiver corresponding to the position it occupied in the camera system of the transmitter. The synthetic highs converter may include a plurality of multivibrators (not shown), one for each input circuit, which when switched or triggered produces an output voltage proportional to the quantized signal at the flip flops FR1 to FR3.

*Synthetic highs generator*

A typical output signal of the synthetic highs converter is illustrated in FIG. 7*c*. This signal is coupled to an input terminal of a delay line of the magnetostrictive type or other suitable type generally designated DL and forming part of a synthetic highs generator SHG. This delay line is provided with 12 signal taps. As shown, these signal taps are connected to the inputs of identical amplifiers A1 to A12. The outputs of the six amplifiers grouped on the left of the delay line, as shown, are coupled in parallel to one input terminal of a difference amplifier DA3 and the remaining six amplifiers have their output terminals coupled in parallel to the remaining input terminal of the difference amplifier.

The distance between the taps on the delay line is selected to provide a time interval in pulse transition corresponding to the time from element to element in scanning of the monitor. Thus as a pulse is propagated down the delay line, an output signal combination is produced by the amplifiers A1 to A12 of the type indicated in FIG. 7*d*, resulting in an output of the difference amplifier DA3 of a synthetic edge signal of the type illustrated in FIG. 7*e*. This synthetic edge signal is coupled to one input terminal of a summing amplifier generally designated SA3.

*Digital lows decoder*

The "lows" temporary storage system LTS is controlled during readout by a signal CPO which may be of the same frequency and which may operate synchronously with the signal CPO of the transmitter. As will be recalled, the signal CPO at the transmitter (see the lower group of signals in FIG. 8) controls the transmission of the low frequency components of the picture or video signal. A typical output signal LCS being identified in FIG. 8. In any case, the signal CPO in the receiver is synchronized with the receiver system timing so that the output of the "lows" temporary storage LTS after decoding is coupled simultaneously to the input of the summing amplifier SA3 with the corresponding "highs" signal produced by the difference amplifier DA3, to produce a synthetic video signal which is coupled to the monitor (not shown) corresponding in all essential respects to that which was produced by the camera tube in the transmitter and occupying a corresponding position in a particular display line of the monitor.

Since the coding of the low frequency components of the picture or video signal is accomplished in the transmitter in a circuit using a single shot multivibrator 1MV, decoding in the receiver may be accomplished in a digital "lows" decoder circuit DLD, employing a single shot multivibrator 2MV as the input element. Signals which are transmitted serially from the "lows" temporary storage device LTS under the control of the signal CPO, now switch the single shot multivibrator. This multivibrator will be triggered for each positive signal which is produced. The multivibrator restores itself between each output signal and remains in restored or reset condition in the absence of the positive signal. The output of the single shot multivibrator 2MV is coupled to the input circuit of a low-pass filter 2LPF. This filter passes the low frequency components of the multivibrator. The output circuit of the low-pass filter is coupled to the input circuit of the summing amplifier SA3 as described.

*Synchronizing*

Frame and line end signals for controlling the receiver monitor are produced by the output of "and" gate AG28. This "and" gate also has four input circuits, three of which are coupled to selected output terminals of the flip flops FR1 through FR3 and the remaining one of which is coupled to the output terminal of the "and" gate AG20 constituting the output of the comparator circuit CO. This "and" gate AG28 produces an output in accordance with the eighth or synchronizing voltage state configuration of the edge amplitude coder flip flops FB1, FB2 and FB3 at the transmitter. It will be recalled that the flip flops FB1 through FB3 of the amplitude coder were switched to their 101 configuration with the occurrence of each video end signal GVE. This same signal is now reproduced in the receiver in synchronism with the comparator output for positioning purposes and indicates the position of the frame and line end for the monitor display in the receiver.

Thus by serially transmitting and receiving the coded "highs" signals and "lows" signals of the picture and processing the signals in the same sequence in the receiver it is possible to synchronize the video signal produced by the camera tube system at the transmitter, in the receiver, in a position corresponding to the position of these signals in the picture frame at the transmitter.

ANALOG MEMORY

Figure 11:
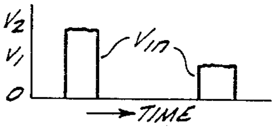
FIGS. 11 and 12 are respective typical input and output voltages of the analog memory circuit of FIG. 10.
Figure 12:
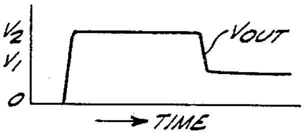

The analog memory circuit of FIG. 9 comprises an input resistor R28 coupled between the input and output terminals and a storage capacitor C28 coupled between the output terminal and ground. The input terminal is grounded through a resistor R29 having an ohmic value many times greater than that of resistor R28. FIGS. 11 and 12 show the input $V_{in}$ and output $V_{out}$ voltage characteristics. Capacitor charging and discharging in the presence of an input signal is controlled by the resistor R28 as is evident from the circuit characteristics of FIGS. 11 and 12. The circuit is conventional.

QUANTIZER

Figure 14:
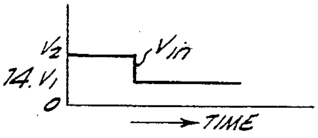
FIGS. 14 and 15 illustrate typical input and output characteristics of the circuit of FIG. 13.
Figure 15:
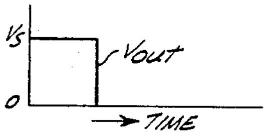

A typical quantizer circuit, herein depicted as the quantizer Q2 (see FIG. 6*a*), is shown in FIG. 13. A transistor QT4 has its base biased by a voltage $+V_1$. A second transistor QT3 has its base coupled to an input terminal receiving an input voltage $V_{in}$. The emitters are commonly coupled to a supply of negative voltage $-V_s$ by a resistor R30. Resistors R31 and R32 couple the respective collectors to a supply of positive voltage $+V_s$. The output terminal is connected between resistor R32 and the collector of transistor QT4. Voltage $+V_1$ normally causes transistor QT4 to conduct and if resistors R32 and R33 are about of equal ohmic value $V_{out}$ is approximately zero. If at time zero (see FIGS. 14 and 15), a voltage $V_{in}$ exceeding voltage $+V_1$ is applied to the input terminal the rising emitter voltage on transistor QT4 causes it to stop conducting and the collector voltage approaches $+V_s$ as shown.

SAMPLER

Figure 16:
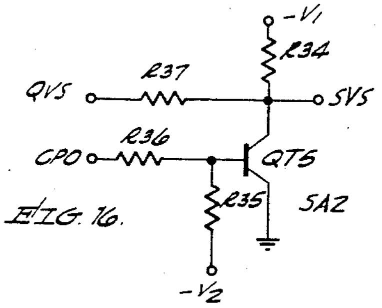
FIG. 16 illustrates a typical sampler circuit.

The sampler circuit of FIG. 16 shows the sampler circuit SA2 but is typical of the other circuits. A p-n-p transistor QT5 has a grounded emitter and a collector coupled to $-V_s$ by a resistor R34. The collector is connected directly to the output terminal at which a sampled video signal SVS is produced. Fixed bias voltage $-V_2$ is coupled to the base by a resistor R32 and readout pulse CPO is coupled to the base by a resistor R36. The input signal QVS, which in this case is the output of difference amplifier DA1, is coupled to the collector and the output terminal by a resistor R37. Normally, transistor QT5 is conducting which clamps the output at approximately ground potential. The signal CPO cuts off the transistor and the voltage QVS now controls the output terminal producing the signal SVS. In the sampler SA1 the delayed edge scanning signal DCSE is coupled to the terminal receiving signal CPO in FIG. 16 and the edge signal from difference amplifier DA2 is coupled to the terminal receiving the signal QVS in FIG. 16. Similarly, in samplers SA6 and SA7 signals FR and TR enable passing of video signals VS for "highs" and "lows" scanning, respectively.

LINE-TO-LINE, EDGE CORRELATION

Figure 17:
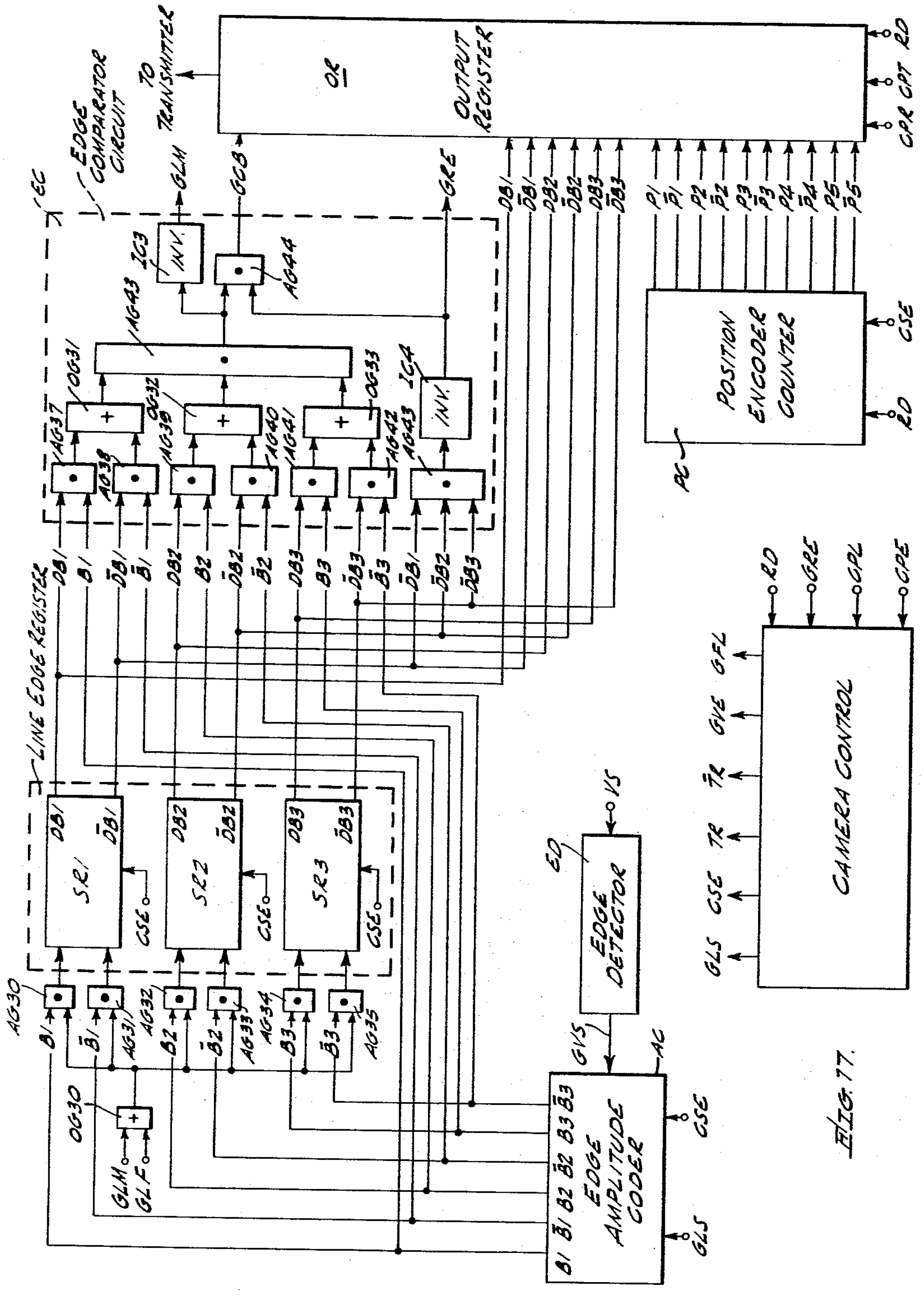
FIG. 17 illustrates a further embodiment of this invention for reducing the redundant transmission of picture information.

The transmission of redundant picture or video signal information at the transmitter may be further minimized in a circuit which compares picture edge signals on a line-to-line basis. A circuit for accomplishing this is illustrated in FIG. 17. Here, parts corresponding to those in FIG. 6*a*, for instance, bear like reference characters.

Figure 18:
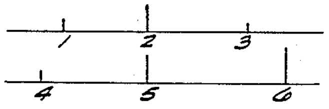
FIG. 18, illustrates two lines of picture edges.

The philosophy of line-to-line correlation is to examine adjacent lines and to transmit only one edge of a vertical pair of edges of the same amplitude. As an example, in FIG. 18, identical edges, 2 and 5, appear in the same line positions in the first and second lines. It is not necessary to transmit edge 5 if when edge 2 is transmitted an added bit of information is sent to indicate that another edge of the same amplitude should be inserted below edge 2. Thus, in this example, edges 1, 2, 3, 4, and 6 would be transmitted in that order. Edge 2 will indicate a vertical edge correlation. At the receiver, an edge identical to edge 2 in amplitude will be placed in the position that edge 5 occupied in the original picture. The result of this operation is that the run lengths of a picture will be increased. This means that fewer code bits will be needed to describe a picture and therefore the bandwidth will be effectively reduced.

The transmitting system shown in FIG. 17 is identical to the basic system except for the inclusion of a line memory and associated gating elements. The line memory consists of three 512-bit registers SR1, SR2 and SR3 that store the amplitude of edges.

For edge coding, each edge is coded by three bits for brightness, five bits for position, and one bit for correlation. The three brightness code bits specify three positive and three negative levels and a null band of amplitude. Since line correlation will increase the length of runs over the basic system, a longer run length code will be required. The correlation bit is an extra bit of information that is affixed to each set of brightness and position bits. If the bit is a binary one, it will indicate that a correlation has been made between adjacent vertical edges. A binary zero will indicate the absence of correlation.

In order to make a comparison between edges on adjacent lines, it is necessary to store a line of edge information. As each edge is generated, it will be placed in a memory register if no correlation is present between the new edge and the adjacent edge from the line above. If the two edges are equal, the most recent edge is not stored since it will not be transmitted.

A detailed example of the implementation of the digital edge coder is shown in FIG. 6*a*. In the digital edge coder, edges are detected by obtaining the difference signal of adjacent picture elements in the edge detector. An edge occurs when the difference signal exceeds a threshold level. The amplitude of the edge is coded with three bits by the edge amplitude coder and then fed, as seen in FIG. 17, to the edge comparator. The edge of the previous line in the same picture element position which is stored in the line edge register is also sent to the edge comparator. Note that if the previous line did not have an edge at that position, the output of the line edge register will be zero. If the two inputs to the edge comparator are equal and not zero, a comparison signal GLM will be sent to the register gate OG30 to inhibit the storage of the new edge. If no comparison is made, the new edge will be stored in the line edge register. When a comparison is made the edge comparator also generates a correlation bit signal GCB to set a correlation bit flip-flop (not shown) of the output register.

When the output of the line edge register is non-zero, the edge reset signal GRE causes the scan to halt and prevents the line edge register from shifting by inhibiting the element scan pulse CSE. The picture scan and register shifting resumes when the output register read control signal RD allows the edge to be transferred to the output register for subsequent transmission, as described in connection with FIGS. 6*a* and 6*b*.

During the scanning of the first line of a picture the camera control unit generates a signal (GFL) which allows all of the edges of the first line to be stored in the line edge register.

More in particular, in this embodiment of the invention, an edge detector ED represents in block form the circuits of FIG. 6*a*, including delay circuit D2, analog memory AM and difference amplifier DA1, which generate the edge signal. This signal is coupled as an input signal to the edge amplitude coder circuit AC which as seen in FIG. 6*a* receives the edge scan signal CSE and which in this case is shown as additionally receiving the signal GLS. These signals are shown in the amplitude coder AC of the transmitter. The output of this edge amplitude coder AC represented in the brightness bits B1 through B3 and $\overline{B}1$ through $\overline{B}3$ is coupled to the indicated inputs of respective "and" gates AG30 through AG35, each of which additionally receives the timing signal GLM of GLF through an "or" gate OG30. The outputs of the respective pairs of "and" gates receiving the B and $\overline{B}$ signals from the respective flip-flops of the edge amplitude coder are coupled to the input circuits of respective shift registers SR1, SR2 and SR3, each of which is synchronized by the edge scanning pulse CSE. The shift registers each have two channels, one for the B signal and one for the $\overline{B}$ signal and terminate in respective output circuits typically represented in shift register SR1, by the circuits DB1 and $\overline{D}$B1.

The output circuits of these shift registers are coupled to one input circuit of each of "and" gates AG37 through AG42, constituting part of the input circuits of an edge comparator circuit EC. The remaining terminal of each of the named "and" gates receives a B or $\overline{B}$ signal directly from the output circuits of the flip-flops of the amplitude coder AC. Thus, it will be seen that each B1 signal for instance is compared with each DB1 signal delayed exactly one full picture line from the following B1 signal. Similar considerations apply to each of the remaining signals from the amplitude coder and from the respective shift registers. The outputs of the pairs of "and" gates AG37 through AG42 are coupled to the two input circuits of each of "or" gates OG31, OG32 and OG33, in turn having their output circuits coupled to the input circuits of an "and" gate AG43. The output of "and" gate AG43 is coupled to one input terminal of an "and" gate AG44 and is also coupled to the input of an inventor circuit IC3, the output of which is the signal GLM which is coupled back to the one input terminal of "or" gate OG30. "And" gate AG44, which is the output "and" gate of the edge comparator circuit, produces a gated correlation bit GCB which is coupled to a correlation bit flip flop (not shown) in the output register. This signal exists at any time that an edge of a following line corresponds in position and quantized brightness with an edge on a preceding line and is transmitted by the transmitter.

In this embodiment of the invention the position coder circuit is the same as that illustrated in FIG. 6*b* and designated PC, excepting that one additional flip-flop is employed to provide a finer degree of position coding of a picture edge within each scan interval. The position coder is controlled by the signal CSE as before and is reset by the reset signal RD produced by the output register OR. The delayed brightness bits are coupled to the output register as shown. These six bits DB1 through DB3 and $\overline{D}$B1 through $\overline{D}$B3 are coupled through gating networks such as the gating networks GN1 and GN2 of FIG. 6*b* to the indicated inputs of the flip-flops FS1 through FS7 of the output register.

*Receiving system*

The receiving system is not illustrated but is the same as that of the basic system except for a line edge memory and correlation monitor. The correlation monitor examines edge words stored in the processing register and transfers an edge word to the line edge memory if the correlation bit indicates an edge correlation. The line edge memory stores the edge word and places it back in the processing register at the time of the same element position during the decoding of the following line.

A complete system has been described to code a television picture for interplanetary transmission in order to reduce either the power or the time required for transmission. Statistical techniques and psychophysical properties of sight form the basis of this coding scheme.

The major informational content of a picture lies in its outline, or edges, which occupies only a small part of the total picture. A bandwidth saving is made by transmitting only the edges and the large area brightness variations of the picture.

In the stop-scan edge detection system herein the low-frequency brightness information is transmitted by a deltamodulation code. The edges of the picture are detected and transmitted by a code which characterizes the amplitude and position of each edge. At the receiver the edges and low-frequency code bits are decoded and combined to obtain the original picture.

Transmitting time or power is reduced by a factor of about four or greater over straight five-bit PCM transmission. This reduction is accomplished with only a small increase in system complexity compared to a conventional PCM system.

Although the invention has been described making specific reference to circuits applicable therein, it will be appreciated by those skilled in the art that other and different specific circuits may be employed. For instance, the transistorized flip-flop circuit may be replaced by other conventional types of circuits such as those involving electron tubes or involving magnetic devices of various types connected in sutiable switching arrangements. Similar consideration apply to the quantizer circuit of FIG. 13. The buffer storage memory described herein may be of the magnetic type, as stated, or, they may involve transistor circuits in conventional switching circuit arrays. Additionally, gating circuits have been employed under the control of switching devices to affect a transfer of signal information among any one of several different points. Other arrangements achieving the same logical control may be substituted for such circuit arrangements.

Accordingly, it is intended that the foregoing disclosure and the showings made in the drawings shall be considered only as illustrative as the principles of this invention and not construed in a liimting sense.

What is claimed is:

1. A television transmitting system comprising:

a television camera for producing video signals;

a control circuit including a scan control circuit coupled to said camera for scanning the electron beam of said camera;

an edge detector for receiving video signals and producing an output edge signal proportional to the difference between successive video signals;

a quantizer coupled to said edge detector for producing an output signal when said edge signal exceeds a predetermined magnitude;

circuit means including a transmitter coupled to said quantizer for coding and for transmitting said edge signal;

means coupled to said quantizer and responsive to the output thereof and coupled to said control circuit for stopping scanning;

timing means for repetitively initiating scanning a lows detector;

a transmit control circuit having a first output coupled inputwise to said edge detector and having a second output coupled inputwise to said lows detector and having an input coupled to said camera to receive said video signals;

switching means coupled to and controlled by said scan control circuit and coupled to said transmit control circuit to selectively enable said first and second outputs of said transmit control circuit with each full scan cycle of said scan control circuit for selectively passing said video signals to said edge detector or to said lows detector;

and means coupling said lows detector to said transmitter.

2. Apparatus as set forth in claim 1 and, in addition, circuit means responsive to said switching means when said switching means has operated said transmit control circuit to couple said video signals to said lows coder for directly coupling said timing means to said scan control circuit for scanning said electron beam at a rate directly controlled by said timing means.

3. A television system comprising:

a transmitting system having a television camera, scanning counters coupled to and controlling said camera, a picture edge difference detector coupled to and receiving video signals from said camera and producing edge signals which are the difference between successive video signals, amplitude coding means coupled to said edge detector and receiving and quantizing and coding said edge signals, a position coder counter operated synchronously with said scanning counters and having a plurality of count cycles within each cycle of said scanning counters, means controlled by said amplitude codes for stopping said scanning counters and said position coder counter, and means coupled to said amplitude coding means and said position coder counter for receiving and transmitting signals therefrom;

and a receiving system comprising a receiver, temporary storage means coupled to and receiving the electrical output of said receiver, a buffer storage memory receiving the output of said temporary means, a processing register receiving the output of said buffer storage memory, and producing edge position signals and edge amplitude signals, a position count generator producing position count signals, comparator means coupling and comparing said edge position and position count signals, gating means coupled to said comparator and receiving said edge amplitude signals, converting means receiving the output of said gating means, and means coupled to said gating means for generating a synthetic "highs" signal.

4. A television receiver system for receiving coded "highs" signals and coded "lows" signals from a television transmitter sending the coded "highs" and "lows" signals on different subcarriers, said "highs" signals comprising coded edge amplitude and edge position signals:

a receiver having a pair of subcarrier detector circuits coupled to respective output circuits;

a "highs" temporary storage circuit coupled to one output circuit;

a "lows" temporary storage circuit coupled to the other output circuit;

a buffer storage circuit coupled to said highs temporary storage circuit;

a processing register coupled to and receiving edge position and edge amplitude signals from said buffer storage circuit;

a position count generator producing position count signals;

a comparator coupled to said position count generator and said processing register for receiving said position count signals and said edge position signals and producing a comparator output signal;

a synthetic highs converter coupled to said comparator and said processing register and controlled by said comparator for converting said edge amplitude signals;

a synthetic highs generator coupled to said synthetic highs converter and producing a synthetic highs signal;

a digital lows decoder coupled to said "lows" temporary storage;

and scanning means coupled to said synthetic highs generator and said digital lows decoder for producing a synthetic video signal.

5. Apparatus as set forth in claim 4 including additionally, circuit means coupling the output of said comparator to said buffer storage to control said buffer storage.

6. Apparatus as set forth in claim 4 in which said processing register comprises a plurality of flip flops and said position count generator comprises a plurality of flip flops, and circuit means coupling said comparator to said position count generator to reset said flip flops.

References Cited

UNITED STATES PATENTS 2,752,421 6/1956 Ross ---------------- 178—6

FOREIGN PATENTS 854,026 11/1960 Great Britain.

OTHER REFERENCES

Schreiber et al.: "Synthetic Highs—An Experimental TV Bandwidth Reduction System," Journal of the SMPTE, August 1959, vol. 68, pp. 525–537.

JOHN W. CALDWELL, *Acting Primary Examiner.*

R. L. RICHARDSON, *Assistant Examiner.*